US012179609B2

(12) United States Patent
Weslati et al.

(10) Patent No.: US 12,179,609 B2
(45) Date of Patent: Dec. 31, 2024

(54) TECHNIQUES FOR SEGMENTED MONITORING OF POWERTRAIN PROPULSIVE TORQUE IN ELECTRIFIED VEHICLES

(71) Applicants: Feisel Weslati, Troy, MI (US); Behrouz Ashrafi, Northville, MI (US); Jaihyun Lee, West Bloomfield, MI (US)

(72) Inventors: Feisel Weslati, Troy, MI (US); Behrouz Ashrafi, Northville, MI (US); Jaihyun Lee, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 226 days.

(21) Appl. No.: 17/991,870

(22) Filed: Nov. 22, 2022

(65) Prior Publication Data
US 2024/0166053 A1    May 23, 2024

(51) Int. Cl.
*B60L 3/00*    (2019.01)

(52) U.S. Cl.
CPC ....... *B60L 3/0084* (2013.01); *B60L 2240/545* (2013.01); *B60L 2240/549* (2013.01); *B60L 2250/28* (2013.01)

(58) Field of Classification Search
CPC .......... B60W 50/0097; B60W 60/001; B60W 40/105; B60W 2050/0024; B60W 2050/0052; B60W 2050/0083
See application file for complete search history.

(56) References Cited

U.S. PATENT DOCUMENTS

| | | | |
|---|---|---|---|
| 7,313,470 B2 * | 12/2007 | Zaremba ............... | B60W 10/06 701/52 |
| 8,548,712 B2 * | 10/2013 | Oesterreicher ... | B60W 50/0205 318/432 |
| 8,775,046 B2 | 7/2014 | Kaster et al. | |
| 9,090,245 B2 * | 7/2015 | Livshiz ................. | B60W 10/10 |
| 10,759,409 B2 | 9/2020 | Ashrafi et al. | |
| 10,994,722 B2 | 5/2021 | Ashrafi et al. | |
| 2012/0059539 A1 * | 3/2012 | Arnett ................... | B60W 10/26 903/903 |
| 2012/0290187 A1 | 11/2012 | Oesterreicher et al. | |
| 2015/0151736 A1 * | 6/2015 | Kim ..................... | B60W 20/10 180/65.265 |

* cited by examiner

*Primary Examiner* — Ramsey Refai
(74) *Attorney, Agent, or Firm* — Jeremy J. Klobucar

(57) ABSTRACT

Control systems and methods for an electrified powertrain of an electrified vehicle include performing, by a main control system, a sequence of first processes based on an initial input including a set of signals indicative of at least one of a driver torque request and expected vehicle behavior and other intermediary inputs to generate a sequence of first outputs and performing, by a secondary monitoring system distinct from the main control system, a sequence of second processes based on the initial input and other intermediary inputs to generate a sequence of second outputs. The secondary monitoring system then attempts to rationalize each first output relative to its respective second output. Based on the rationalization, one of these outputs is used as an intermediary output in the sequence until a rationalized final output is obtained and used to generate control commands for torque actuators of the electrified powertrain.

18 Claims, 3 Drawing Sheets

TECHNIQUES FOR SEGMENTED MONITORING OF POWERTRAIN PROPULSIVE TORQUE IN ELECTRIFIED VEHICLES

FIELD

The present application generally relates to electrified vehicle powertrain torque control and, more particularly, to techniques for segmented monitoring of powertrain propulsive torque in electrified vehicles.

BACKGROUND

An electrified vehicle (a battery electric vehicle (BEV), a plug-in hybrid electric vehicle (PHEV), etc.) has an electrified powertrain that typically comprises a plurality of torque actuators, such as multiple electric motors or an internal combustion engine and one or more electric motors. A main control system determines a desired powertrain propulsive torque based on a driver pr am autonomous torque request (e.g., accelerator pedal depression) and commands the torque actuators to collectively generate the desired powertrain propulsive torque. For increased redundancy and safety, a secondary monitoring system could also determine the desired powertrain propulsive torque and compute the commanded propulsive torque.

A difference between the desired and commanded torques or error exceeding a threshold could be indicative of a malfunction (processor failure, memory corruption, etc.), which could result in the electrified vehicle transitioning to a limited performance mode (e.g., limp-home) or being fully disabled. However, false positive malfunction detections often occur, particularly during dynamic transitions of powertrain components, which could result in the vehicle being inadvertently disabled. Accordingly, while these conventional electrified powertrain control systems do work well for their intended purpose, there exists an opportunity for improvement in the relevant art.

SUMMARY

According to one example aspect of the invention, a control system for an electrified powertrain of an electrified vehicle is presented. In one exemplary implementation, the control system comprises a main control system configured to perform a sequence of first processes based on an initial input including a set of signals indicative of at least one of a driver torque request and expected vehicle behavior and other intermediary inputs to generate a sequence of first outputs, and a secondary monitoring system distinct from the main control system and configured to perform a sequence of second processes based on the initial input and other intermediary inputs to generate a sequence of second outputs and to rationalize each first output by comparing it to its respective second output, when rationalized, using the particular first output as a subsequent intermediary input for both the main control system and the secondary monitoring system, when not rationalized, using the particular second output as the subsequent intermediary input, and using a rationalized final first output or a final second output to generate control commands for torque actuators of the electrified powertrain, wherein the rationalizing of the first outputs during the sequences of first and second processes is configured to reduce or eliminate false positive malfunction detections in the main control system.

In some implementations, the secondary monitoring system is further configured to generate a flag or increment a counter for every first output that is not rationalized. In some implementations, the secondary monitoring system is further configured to generate the flag or increment the counter for every first output that is not rationalized and also exceeds upper/lower boundary metrics. In some implementations, the secondary monitoring system is further configured to detect a positive malfunction in the main control system when a quantity of flags or the counter exceeds a calibratable threshold. In some implementations, the secondary monitoring system is further configured to command a limited limp-home mode or fully disable the electrified vehicle upon detecting the positive malfunction in the main control system.

In some implementations, the sequences of first and second processes include at least one of accelerator pedal sensor voltage determination, accelerator pedal depression percentage, and desired powertrain propulsive torque. In some implementations, the sequences of first and second processes include at least the accelerator pedal sensor voltage determination, the accelerator pedal depression percentage, and the desired powertrain propulsive torque. In some implementations, at least the sequence of first processes is based on at least one of battery current and battery temperature, and wherein a high voltage shock incident causes a particular first output to not be rationalized. In some implementations, the main control system and the secondary monitoring system are distinct from each other and are executed in parallel by two processors or by two cores of a single processor.

According to another example aspect of the invention, a control method for an electrified powertrain of an electrified vehicle is presented. In one exemplary implementation, the control method comprises performing, by a main control system, a sequence of first processes based on an initial input including a set of signals indicative of at least one of a driver torque request and expected vehicle behavior and other intermediary inputs to generate a sequence of first outputs, performing, by a secondary monitoring system distinct from the main control system, a sequence of second processes based on the initial input and other intermediary inputs to generate a sequence of second outputs, rationalizing, by the secondary monitoring system, each first output by comparing it to its respective second output, when rationalized, using, by the secondary monitoring system, the particular first output as a subsequent intermediary input for both the main control system and the secondary monitoring system, when not rationalized, using, by the secondary monitoring system, the particular second output as the subsequent intermediary input, and using, by the secondary monitoring system, a rationalized final first output or a final second output to generate control commands for torque actuators of the electrified powertrain, wherein the rationalizing of the first outputs during the sequences of first and second processes is configured to reduce or eliminate false positive malfunction detections in the main control system.

In some implementations, the secondary monitoring system is further configured to generate a flag or increment a counter for every first output that is not rationalized. In some implementations, the secondary monitoring system is further configured to generate the flag or increment the counter for every first output that is not rationalized and also exceeds upper/lower boundary metrics. In some implementations, the secondary monitoring system is further configured to detect a positive malfunction in the main control system when a quantity of flags or the counter exceeds a calibratable threshold. In some implementations, the secondary monitoring system is further configured to command a limited limp-home mode or fully disable the electrified vehicle upon detecting the positive malfunction in the main control system.

In some implementations, the sequences of first and second processes include at least one of accelerator pedal sensor voltage determination, accelerator pedal depression percentage, and desired powertrain propulsive torque. In some implementations, the sequences of first and second processes include at least the accelerator pedal sensor voltage determination, the accelerator pedal depression percentage, and the desired powertrain propulsive torque. In some implementations, at least the sequence of first processes are based on at least one of battery current and battery temperature, and wherein a high voltage shock incident causes a particular first output to not be rationalized. In some implementations, the main control system and the secondary monitoring system are distinct from each other and are executed in parallel by two processors or by two cores of a single processor.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, false positive malfunction detections in electrified powertrain control systems often occur, particularly during dynamic transitions of powertrain components, which could result in the driver possibly being inadvertently stranded. Accordingly, improved techniques that reduce or eliminate false positive malfunction detections are presented. These false positive malfunction detections often occur because the monitoring system logic/algorithms are duplicative of those in the main control system, but separately run (e.g., in parallel using two processors or two processor cores). These techniques involve segmented monitoring where the main control system variables are rationalized in the monitoring system. When rationalized, the main control system variables are used in both routines, and when not rationalized, the monitoring system variables are used in both routines, thus eliminating the differences therebetween and reducing/eliminating false positive malfunction detections.

Figure 1:
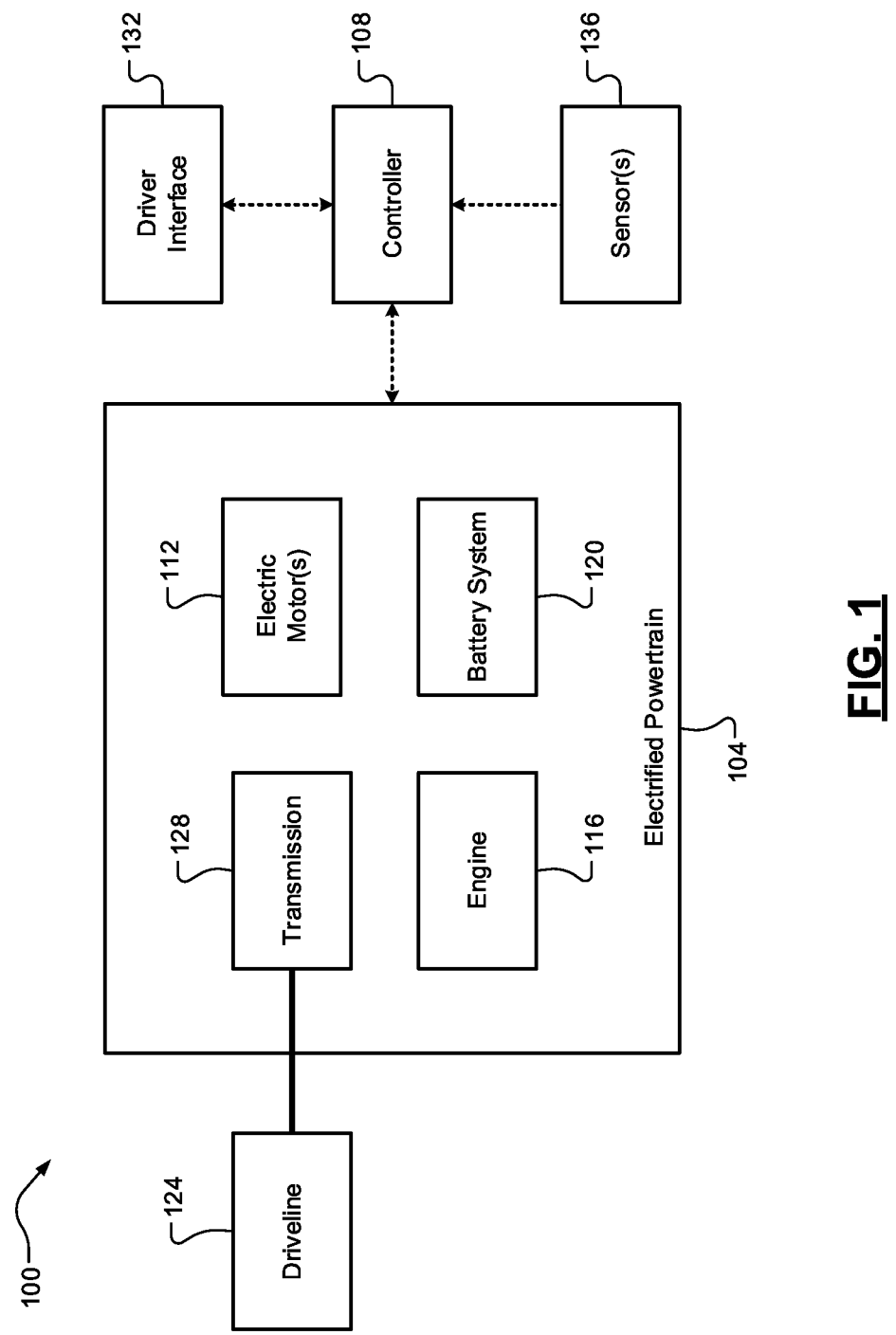
FIG. 1 is a functional block diagram of an electrified vehicle having an electrified powertrain and a control system according to the principles of the present application.

Referring now to FIG. 1, a functional block diagram of an example electrified vehicle 100 having an electrified powertrain 104 and a control system 108 according to the principles of the present application is illustrated. The electrified powertrain 104 comprises at least two torque actuators. As shown, the electrified powertrain 104 comprises one or more electric motors 112 and an optional internal combustion engine 116. The electric motor(s) 112 are powered by electrical energy (e.g., current) from a high voltage battery system 120 and are configured to generate drive torque. The engine 120 is configured to combust a mixture of fuel (e.g., gasoline) and air to drive a crankshaft (not shown) and generate drive torque. It will be appreciated that the electrified powertrain 104 could have any suitable configuration, such as two electric motors 112 (e.g., one per axle), at least one electric motor 112 and the engine 120, and other combinations thereof in series or parallel hybrid configurations. In most configurations, the drive torque generated by the various torque actuators is then transferred to a driveline 124 of the electrified vehicle 100 via a transmission 128.

The control system 108 is configured to control the electrified powertrain 104 and, more particularly, a torque split or distribution between the various torque actuators to satisfy a driver torque request. The driver torque request is provided by a driver of the electrified vehicle 100 via a driver interface 132. One non-limiting example of the driver interface is a physical accelerator pedal that is depressed and modulated by the driver to provide the driver torque request as measured by a voltage sensor (e.g., reading 0 volts (V) to a maximum voltage of zero/full depression endpoints and therebetween). A set of sensors 136 are also configured to measure operating parameters of the electrified powertrain 104 such as, but not limited to, rotational speeds (e.g., shaft speeds), temperatures, battery system state of charge (SOC), and the like. These measured operating parameters and the driver torque request are fed as inputs to the control system 108, which processes these inputs to generate control commands (e.g., vector-based commands) for the various torque actuators.

Figure 2:
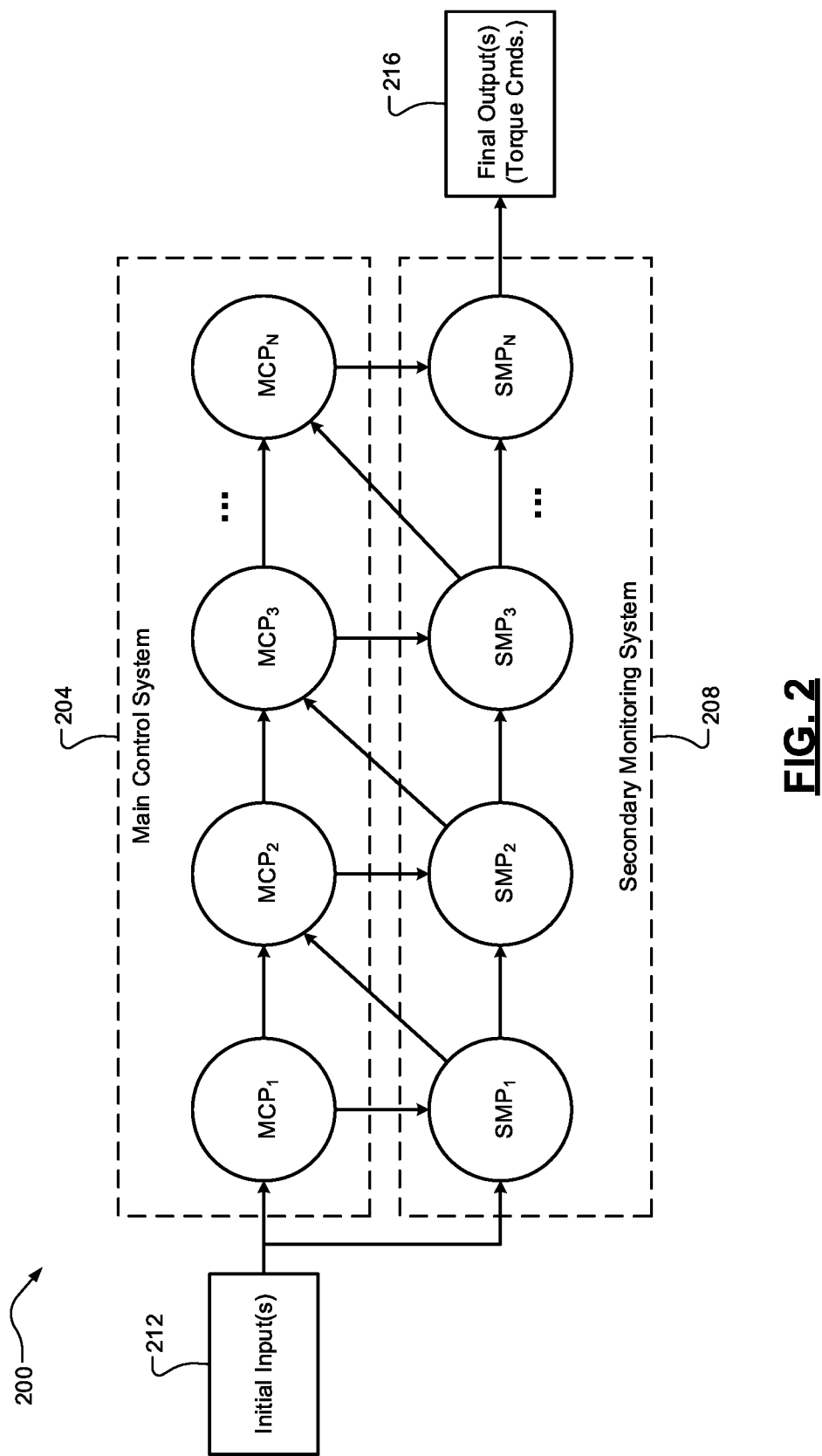
FIG. 2 is a functional block diagram of an example architecture of the control system of FIG. 1 according to the principles of the present application.

Referring now to FIG. 2, a diagram of an example architecture 200 of the control system 108 of FIG. 1 according to the principles of the present application is illustrated. The control system 108 is generally divided into two distinct portions: a main control system 204 and a secondary monitoring system 208. These separate portions 204, 208 could be executed in parallel by, for example, separate cores of a single processor or two different processors.

As generally discussed above, the secondary monitoring system 208 typically or conventionally compares output values calculated in the same manner as the main control system 204 in order to detect malfunctions (processor failure, memory corruption, etc.) that could result in remedial action (limp-home mode, fully vehicle disablement, etc.). These conventional techniques, however, are prone to false positive malfunction detections (e.g., dynamic powertrain transitions, such as high voltage spikes or shock), which could result in the driver being inadvertently stranded. This could potentially increase driver frustration, negatively affect public perception of electrified vehicles, and/or increase warranty costs.

In the architecture 200 of the present application, the secondary monitoring system 208 attempts to rationalize outputs of the main control system 204 at a plurality of segmented monitoring points. Both the main control system 204 and the secondary monitoring system 208 receive a same initial input including a set of signals from the driver interface 132 and/or the set of sensors 136. This set of signals includes inputs that are indicative of how to generate and distribute torque commands amongst the various torque actuators. In one exemplary implementation, the set of signals could be indicative of at least one of a driver torque request (e.g., a measurement from an accelerator pedal voltage sensor) and expected vehicle behavior (e.g., maximize efficiency, maximize response/performance, etc.). The main control system 204 is configured to perform a sequence of first processes referred to as $MCP_1 \ldots MCP_N$ (collectively, MCPs), where N is an integer greater than one. A final first process $MCP_N$ determines or calculates torque commands for the various torque actuators. There could also be intermediate or intermediary first processes $MCP_2$, $MCP_3$, etc., depending on the configuration of the control system 108 and the electrified powertrain 104.

The secondary monitoring system 208 is configured to perform a similar or same sequence of second processes referred to as $SMP_1 \ldots SMP_N$ (collectively SMPs). These processes are the same or similar enough to the respective sequence of first processes such that the outputs of the second processes SMPs can be used for rationalization (e.g., validation) of outputs of the respective first processes MCPs. As shown in FIG. 2, each MCP output is fed as an input to a respective SMP. In one exemplary implementation, the initial first and second processes $MCP_1$ and $SMP_1$ involve accelerator pedal sensor voltage determination. For example, the accelerator pedal voltage sensor could provide an analog voltage reading, and some smoothing/averaging processing could be performed to determine a single voltage value. In this exemplary implementation, the next first and second processes $MCP_2$ and $SMP_2$ involve accelerator pedal depression percentage determination based on the accelerator pedal voltage value(s). Continuing in this exemplary implementation, the next first and second processes $MCP_3$ and $SMP_3$ involve determining the total desired powertrain propulsive torque.

Finally, in this exemplary implementation, the last first and second processes $MCP_N$ and $SMP_N$ (N=4) involve determining the torque commands for the various torque actuators. Other potential intermediate or intermediary first/second processes could also be implemented, such as determining battery/motor capability based on at least one of battery current and battery temperature. The SMP attempts to rationalize the MCP output by comparing the value to its own calculated value. A difference between these two values of less than a calibratable threshold indicates a rationalized or validated MCP output. This MCP output is then utilized as an input to not only a next MCP ($MCP_2$), but also as the input to a next SMP ($SMP_2$). This is to prevent any small/minor error from propagating through the sequence of SMPs and potentially causing a false positive malfunction detection later on.

In contrast, if the MCP output is not rationalized, then the SMP output is utilized as the input to both the next MCP ($MCP_2$) and the next SMP ($SMP_2$). A single error detection (i.e., error greater than the calibratable threshold) will not necessarily result in a malfunction detection for the control system 108 (and more particularly, the main control system 204). In some implementations, bookkeeping/tracking could be implemented such that a quantity of these instances is kept track of.

For example, a flag could be generated or a counter could be incremented at each instance. Once this quantity (e.g., flags/counter) exceeds another calibratable threshold, the malfunction of the main control system 204 could be detected and the secondary monitoring system 208 could take over and execute some remedial action. This remedial action could be, for example, a limited limp-home mode where the electrified powertrain 104 is constrained to a low limit of torque production but still enough to allow the driver to reach his/her home or a service station. A more severe remedial action could be taken, such as full disablement of the electrified powertrain, such as when the quantity (e.g., flags/counter) exceeds an even higher calibratable threshold. In some implementations, the malfunction instance causing a flag generation or counter incrementation will not always occur when the error between the MCP and SMP outputs is greater than the calibratable threshold for rationalization. Instead, other lower/upper boundaries could be applied to determine whether the MCP output is so far off as to require a malfunction instance to be detected and accounted for. These boundaries could be calibratable levels indicative of acceptable safety standards.

Figure 3:
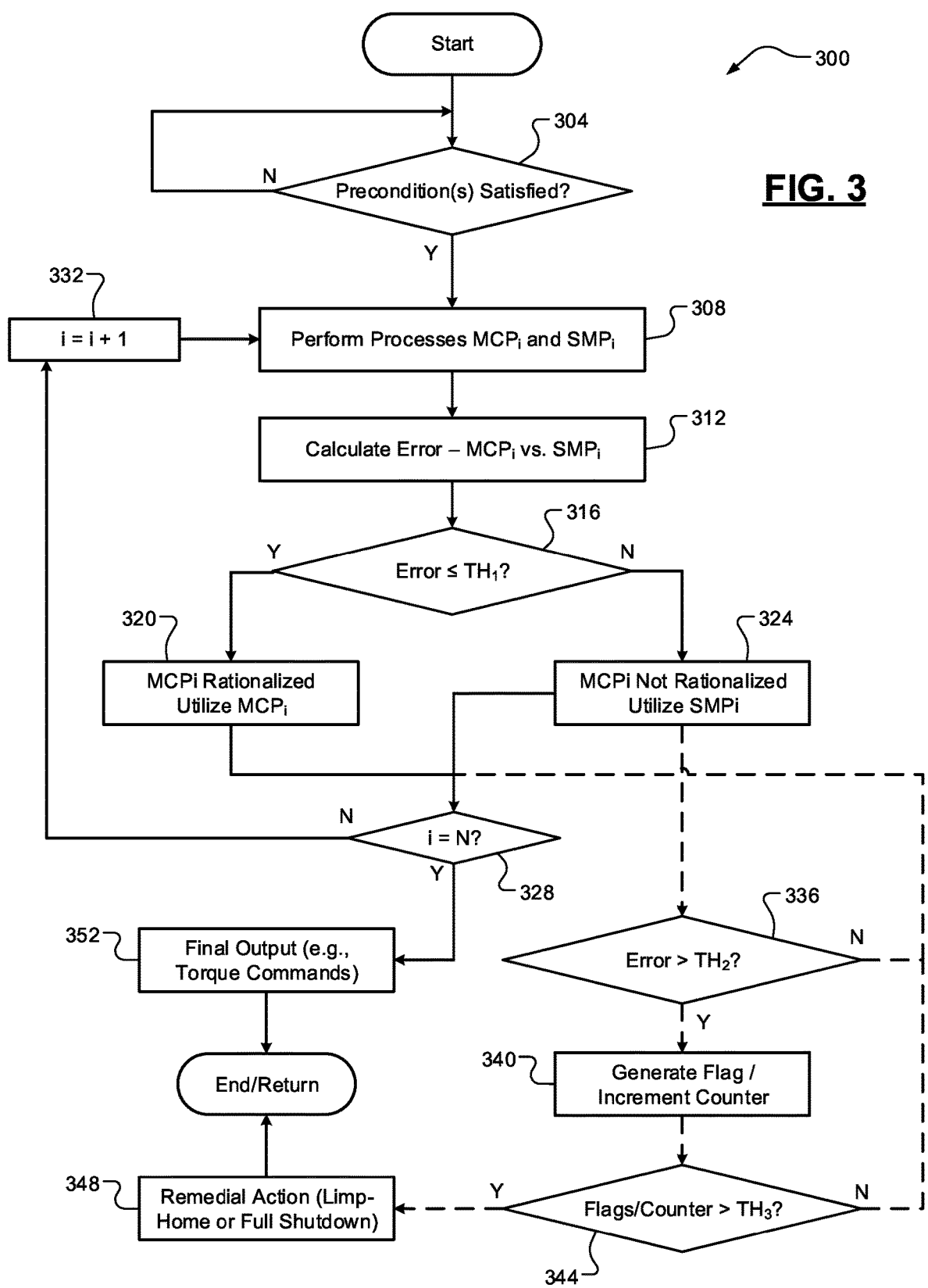
FIG. 3 is a flow diagram of an example electrified powertrain propulsive torque control method for an electrified vehicle according to the principles of the present application.

Referring now to FIG. 3, a flow diagram of an example control method 300 for an electrified powertrain of an electrified vehicle according to the principles of the present application is illustrated. While the components of electrified vehicle 100 and electrified powertrain 104 are specifically references for descriptive purposes, it will be appreciated that the control method 300 could be applicable to any suitable electrified powertrain/vehicle configuration. At optional 304, the control system 108 could determine whether a set of precondition(s) are satisfied. This could include, for example only, the electrified powertrain 104 being operational and no existing/outstanding malfunctions/faults.

When true, the method 300 proceeds to 308. Otherwise, the method 300 ends or returns to 304. At 308, the main control system 204 performs a first process $MCP_i$ and the secondary monitoring system 208 performs a respective second process $SMP_i$. For an initial iteration (index i=1), the set of input signals indicative of the driver torque request and the expected vehicle behavior are used as inputs. For subsequent iterations (i=2 . . . N), the input is either the rationalized output $MCP_i$ or $SMP_i$ when $MCP_i$ is not rationalized.

At 312, the secondary monitoring system 208 determines a difference (error) between the outputs of $MCP_i$ and $SMP_i$. At 316, the secondary monitoring system 208 determines whether the difference is less than or equal to a first calibratable threshold ($TH_1$) indicative of rationalization. When true at 320, the secondary monitoring system 208 rationalizes the output $MCP_i$ and the output $MCP_i$ is utilized as the subsequent input and fed back into 308 and the index value i is incremented (i=i+1) at 332, provided that index i has not yet reached N at 328. When false at 324, the secondary monitoring system 208 does not rationalize the output MCPi and instead the output SMPi is utilized as the subsequent input and fed back into 308 and the index value is incremented (i=i+1) at 332, provided that index i has not yet reached N at 328. As previously discussed, these first and second processes MCPs and SMPs could be any suitable processes, such as those described above herein and combinations thereof.

At optional 336, the secondary monitoring system 208 determines whether the difference/error exceeds a second calibratable threshold ($TH_2$) based on upper/lower system constraints/boundaries and that could be greater than or the same as $TH_1$. When false, the method 300 returns to 308. When true, however, the method 300 proceeds to optional 340 where a flag is generated or a counter is incremented. At optional 344, the secondary monitoring system 208 determines whether the flag quantity or counter value exceeds a calibratable value (TH₃). When false, the method 300 returns to 308. When true, however, the method 300 could proceed to an optional remedial action mode at 348, which could be a limited limp-home more or a full electrified powertrain disablement and the method 300 then ends. Once all of the iterations are performed (i=N) ay 328, at 352 the rationalized output MCP$_N$ or the other output SMP$_N$ is used as or to generate a final output, such as the torque commands for the various torque actuators of the electrified powertrain 104 and the method 300 then ends. The method 300 could then repeat for one or more additional cycles, such as continuously during operation of the electrified powertrain 104.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an electrified powertrain of an electrified vehicle, the control system comprising:
    a main control system configured to perform a sequence of first processes based on an initial input including a set of signals indicative of at least one of a driver torque request and expected vehicle behavior and other intermediary inputs to generate a sequence of first outputs; and
    a secondary monitoring system distinct from the main control system and configured to perform a sequence of second processes based on the initial input and other intermediary inputs to generate a sequence of second outputs and to:
        rationalize each first output by comparing it to its respective second output;
        when rationalized, using the particular first output as a subsequent intermediary input for both the main control system and the secondary monitoring system;
        when not rationalized, using the particular second output as the subsequent intermediary input; and
        using a rationalized final first output or a final second output to generate control commands for torque actuators of the electrified powertrain,
    wherein the rationalizing of the first outputs during the sequences of first and second processes is configured to reduce or eliminate false positive malfunction detections in the main control system.

2. The control system of claim 1, wherein the secondary monitoring system is further configured to generate a flag or increment a counter for every first output that is not rationalized.

3. The control system of claim 2, wherein the secondary monitoring system is further configured to generate the flag or increment the counter for every first output that is not rationalized and also exceeds upper/lower boundary metrics.

4. The control system of claim 2, wherein the secondary monitoring system is further configured to detect a positive malfunction in the main control system when a quantity of flags or the counter exceeds a calibratable threshold.

5. The control system of claim 4, wherein the secondary monitoring system is further configured to command a limited limp-home mode or fully disable the electrified vehicle upon detecting the positive malfunction in the main control system.

6. The control system of claim 1, wherein the sequences of first and second processes include at least one of accelerator pedal sensor voltage determination, accelerator pedal depression percentage, and desired powertrain propulsive torque.

7. The control system of claim 6, wherein the sequences of first and second processes include at least the accelerator pedal sensor voltage determination, the accelerator pedal depression percentage, and the desired powertrain propulsive torque.

8. The control system of claim 1, wherein at least the sequence of first processes are based on at least one of battery current and battery temperature, and wherein a high voltage shock incident causes a particular first output to not be rationalized.

9. The control system of claim 1, wherein the main control system and the secondary monitoring system are distinct from each other and are executed in parallel by two processors or by two cores of a single processor.

10. A control method for an electrified powertrain of an electrified vehicle, the control method comprising:
    performing, by a main control system, a sequence of first processes based on an initial input including a set of signals indicative of at least one of a driver torque request and expected vehicle behavior and other intermediary inputs to generate a sequence of first outputs;
    performing, by a secondary monitoring system distinct from the main control system, a sequence of second processes based on the initial input and other intermediary inputs to generate a sequence of second outputs;
    rationalizing, by the secondary monitoring system, each first output by comparing it to its respective second output;
    when rationalized, using, by the secondary monitoring system, the particular first output as a subsequent intermediary input for both the main control system and the secondary monitoring system;
    when not rationalized, using, by the secondary monitoring system, the particular second output as the subsequent intermediary input; and
    using, by the secondary monitoring system, a rationalized final first output or a final second output to generate control commands for torque actuators of the electrified powertrain,
    wherein the rationalizing of the first outputs during the sequences of first and second processes is configured to reduce or eliminate false positive malfunction detections in the main control system.

11. The control method of claim 10, wherein the secondary monitoring system is further configured to generate a flag or increment a counter for every first output that is not rationalized.

12. The control method of claim 11, wherein the secondary monitoring system is further configured to generate the flag or increment the counter for every first output that is not rationalized and also exceeds upper/lower boundary metrics.

13. The control method of claim 11, wherein the secondary monitoring system is further configured to detect a positive malfunction in the main control system when a quantity of flags or the counter exceeds a calibratable threshold.

14. The control method of claim 13, wherein the secondary monitoring system is further configured to command a limited limp-home mode or fully disable the electrified vehicle upon detecting the positive malfunction in the main control system.

15. The control method of claim 10, wherein the sequences of first and second processes include at least one of accelerator pedal sensor voltage determination, accelerator pedal depression percentage, and desired powertrain propulsive torque.

16. The control method of claim 15, wherein the sequences of first and second processes include at least the accelerator pedal sensor voltage determination, the accelerator pedal depression percentage, and the desired powertrain propulsive torque.

17. The control method of claim 10, wherein at least the sequence of first processes are based on at least one of battery current and battery temperature, and wherein a high voltage shock incident causes a particular first output to not be rationalized.

18. The control method of claim 10, wherein the main control system and the secondary monitoring system are distinct from each other and are executed in parallel by two processors or by two cores of a single processor.

* * * * *